(12) United States Patent
Kuroda

(10) Patent No.: US 6,647,503 B1
(45) Date of Patent: Nov. 11, 2003

(54) MICROCOMPUTER WITH RE-INITIALIZATION OF DRAM OR SRAM USING NON-VOLATILE MEMORY

(75) Inventor: Sachie Kuroda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 337 days.

(21) Appl. No.: 09/639,067

(22) Filed: Aug. 16, 2000

(30) Foreign Application Priority Data

Feb. 29, 2000 (JP) ..................................... 2000-054020

(51) Int. Cl.$^7$ ................................................. G06F 1/13
(52) U.S. Cl. ..................... 713/322; 713/324; 713/320; 710/262
(58) Field of Search ................................. 713/310, 320, 713/322, 330, 340, 324; 711/105–106; 365/222, 226, 229; 710/260, 262, 266

(56) References Cited

U.S. PATENT DOCUMENTS

| | | | | |
|---|---|---|---|---|
| 4,631,701 A | * | 12/1986 | Kappeler et al. | 365/222 |
| 5,283,885 A | * | 2/1994 | Hollerbauer | 711/106 |
| 5,410,707 A | * | 4/1995 | Bell | 711/100 |
| 5,890,195 A | * | 3/1999 | Rao | 711/105 |
| 5,903,507 A | * | 5/1999 | Arimoto | 365/222 |
| 5,928,365 A | * | 7/1999 | Yoshida | 713/324 |
| 6,097,658 A | * | 8/2000 | Satoh et al. | 365/222 |
| 6,216,233 B1 | * | 4/2001 | Baweja | 713/322 |
| 6,243,768 B1 | * | 6/2001 | Khandekar | 710/35 |
| 6,338,108 B1 | * | 1/2002 | Motomura | 710/110 |
| 6,412,052 B2 | * | 6/2002 | Keeth et al. | 711/167 |

* cited by examiner

Primary Examiner—Paul R. Myers
Assistant Examiner—Raymond N Phan
(74) Attorney, Agent, or Firm—Burns, Doane, Swecker & Mathis, LLP

(57) ABSTRACT

The microcomputer comprises: a CPU, a DRAM installed within the microcomputer, a non-volatile memory storing a program data therein, an interface commonly used among various circuits within the microcomputer, a system clock generating circuit, which generates clock signals, and is also capable of suspending and regenerating the clock signals, respectively in response to a system clock stop signal and a system clock generation signal, a peripheral circuit which is capable of outputting an interrupt signal requesting the system clock generation to the CPU, and a control circuit which re-transmits the program data from the non-volatile memory to the DRAM in response to a re-initialize request signal output from the CPU, and also outputs an access prohibition, signal for prohibiting the access to the data stored in the DRAM and an access prohibition release signal for releasing the prohibition of access. Due to this construction, it no longer requires two clock generating circuits; namely a clock generating circuit one for the system and that exclusively used for the DRAM, and thus the function and the level of integration of the microcomputer are not degraded.

5 Claims, 1 Drawing Sheet

MICROCOMPUTER WITH RE-INITIALIZATION OF DRAM OR SRAM USING NON-VOLATILE MEMORY

BACKGROUND OF THE INVENTION

1. Field of the Invention

The present invention relates to a microcomputer, and more particularly relates to a microcomputer which is capable of loading a program into a DRAM or an SRAM memory installed therein and executing the thus loaded program.

2. Description of the Related Art

In recent years, a non-volatile memory such as a mask ROM, an EPROM, a flash memory and the like is provided for storing a program data in a microcomputer, for the purpose of facilitating the development or modification of a program and so on. On the other hand, a vast-storage DRAM is installed in a microcomputer which is used for processing a large amount of data at a high speed. When developing a program for the development of a new product related to a microcomputer carrying a DRAM therein, efficiency of the development is assured by checking the operation of a microcomputer after transmitting a program data from outside the microcomputer chip to the on-board DRAM. Once the development of a program is completed, the program data whose operation has already been checked is stored in a non-volatile memory; namely a mask ROM which is stored almost permanently in the microcomputer, a flash memory which is provided outside the microcomputer chip and so forth.

In order to secure the stable operation of a microcomputer, it is quite important to operate the microcomputer by the same procedure with the one used for executing the operation test. For this reason, in the microcomputer carrying a DRAM therein, it is arranged such that a program data is first transmitted from the non-volatile memory to the DRAM when powered ON, and as soon as the reset state is released thereafter, the CPU accesses the program data thus stored in the DRAM, so that the same operation under exactly the same procedure as the one employed for developing the program can be executed.

For maintaining the data in the DRAM installed in the microcomputer, it is necessary to execute a periodical potential charge; which is so-called a refreshing operation, and for this reason, clock signals must be supplied to a circuit in: which the refreshing operation is carried out. It is to be noted that the most efficient method for saving power consumption of a microcomputer is to suspend the operation of a clock signal generating circuit. However, if the operation of the clock signal generating circuit is suspended, the refreshing operation cannot be properly carried but, and subsequently the data stored in the DRAM is destroyed. Due to this, another clock signal generating circuit, namely a clock signal generating circuit exclusively used for the DRAM should be provided in the DRAM control circuit for executing the refreshing operation.

Since the conventional microcomputer carrying a DRAM therein is configured as such, in order to secure the stable operation of the microcomputer, two clock signal generating circuits are required within one microcomputer chip; namely a clock signal generating circuit for a system clock and that exclusively used for the DRAM, so that the function and the grade of integration of the microcomputer, whose ultimate purpose is to implement maximum functions within a limited chip area, are thereby degraded.

In addition, the fact that a clock signal generating circuit exclusively used for the DRAM is required for securing the stable operation of the microcomputer increases the total power consumption.

Still further, there is also another problem that when the CPU is put in a runaway state, an erroneous writing is likely to occur to the program data area within the DRAM, so that even when the runaway state is recovered thereafter, the microcomputer cannot operate properly due to the destruction of the program data. The same phenomenon can be observed even in the case where an SRAM is used as the program memory instead of the DRAM.

SUMMARY OF THE INVENTION

The present invention has been proposed to solve the problems aforementioned, and it is an object of the present invention to provide a microcomputer carrying a DRAM therein as a program memory, which requires only one clock generating circuit and is thus capable of greatly reducing the power consumption.

It is also another object of the present invention to provide a microcomputer carrying a DRAM or an SRAM therein as a program memory, which can properly operate even in the case where the CPU is put in a runaway state and thereafter the program runaway is recovered.

The microcomputer according to a first aspect of the present invention is constructed in such a manner that it comprises: a CPU, a DRAM installed within the microcomputer, a non-volatile memory storing a program data therein, which non-volatile memory being installed in the microcomputer or provided outside the microcomputer, an interface commonly used among various circuits within the microcomputer, a system clock generating circuit, which generates clock signals and is also. , capable of suspending and regenerating the clock signals, respectively in response to a system clock stop signal and a system clock generation signal, a peripheral circuit which is capable of outputting an interrupt signal requesting the system clock generation to the CPU, and a control circuit which re-transmits the program data from the non-volatile memory to the DRAM in response to a re-initialize request signal output from the CPU, and also outputs an access prohibition signal for prohibiting the access to the data stored in the DRAM and an access prohibition release signal for releasing the prohibition of access.

The microcomputer according to further aspect of the present invention is constructed in such a manner that it comprises; a CPU, a DRAM installed within the microcomputer, a non-volatile memory storing a program data therein, which non-volatile memory being installed in the microcomputer or provided outside the microcomputer, an interface commonly used among various circuits within the microcomputer, a system clock generating circuit for generating clock signals, a peripheral circuit which is capable of detecting the runaway of the CPU and also outputting an interrupt signal requesting the recovery from the runaway to the CPU, and a control circuit which re-transmits the program data from the non-volatile memory to the DRAM in response to a re-initialize request signal output from the CPU, and also outputs an access prohibition signal for prohibiting an access to the data stored in the DRAM and an access prohibition release signal for releasing the prohibition of access.

The microcomputer according to further aspect of the present invention is constructed in such a manner that it comprises; a CPU, an SRAM installed within the microcomputers a non-volatile memory storing a program data therein, which non-volatile memory being installed in the microcomputer or provided outside the microcomputer, an interface commonly used among various circuits within the microcomputer, a system clock generating circuit for generating clock signals, a peripheral circuit which is capable of detecting the runaway of the CPU and also outputting an interrupt signal requesting the recovery from the runaway to the CPU, and a control circuit which re-transmits the program data from the non-volatile memory to the SRAM in response to a re-initialize request signal output from the CPU, and also outputs an access prohibition signal for prohibiting an access to the data stored in the DRAM and an access prohibition release signal for releasing the prohibition of access.

DETAILED DESCRIPTION OF THE PREFERRED EMBODIMENTS

Several embodiments of the present invention are now explained below.

First Embodiment

Figure 1:
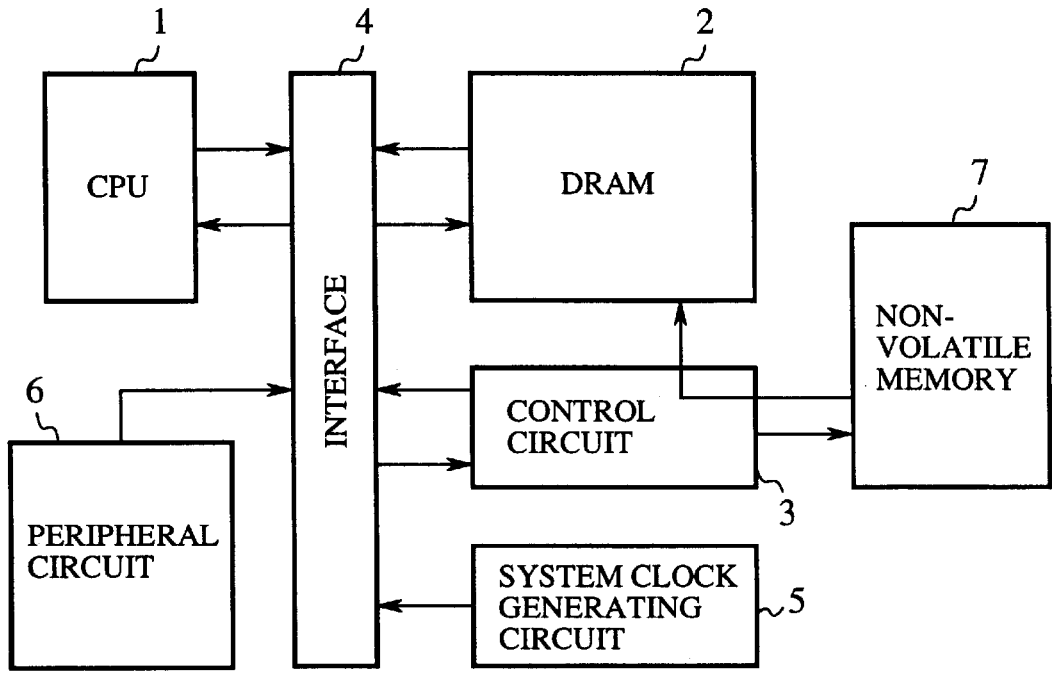
FIG. 1 is a schematic diagram showing the configuration of a microcomputer according to a first embodiment of the present invention.

FIG. 1 is a schematic diagram showing the configuration of a microcomputer according to a first embodiment of the present invention. In the figure, reference numeral 1 denotes a Central Processing Unit (CPU), numeral 2 denotes a DRAM installed in the microcomputer and storing a program data, 3 denotes a control circuit for controlling storing of a program data into the DRAM 2 or the like, 4 denotes an interface commonly used by various circuits in the microcomputer, 5 denotes a system clock generating circuit for generating clock signals used within the microcoputer, 6 denotes a peripheral circuit such as an interrupt circuit or the like, 7 denotes a non-volatile memory in which a program data is stored; namely a mask ROM installed within the microcomputer or a flash memory provided outside the microcomputer.

The operation of the microcomputer of the above configuration is now explained as below.

When a chip configuring a microcomputer is switched ON, the program data stored in the non-volatile memory 7 is transmitted to the DRAM 2 in response to an instruction of, the control circuit 3. When this transmission of the program data is completed, the reset state is released and the CPU 1 accesses the DRAM 2 for the program data, so that the microcomputer starts operating.

Thereafter, when the CPU outputs a stop signal for suspending the generation of clock signals (hereinafter referred to just as a "system clock stop signal") in order to save the power consumption, the system clock generating circuit 5 suspends its operation. By suspending all the clock signals, power consumption can be greatly reduced.

In order to recover from the suspended state of the system clock, the peripheral circuit 6 sends an interrupt signal requiring the recovery of the generation of clock signals to the CPU 1. When the CPU 1 receives this interrupt signal, it outputs to the control circuit 3 and the interface 4 a request signal for re-initialization of the program data (hereinafter referred to as a "program data re-initialize request signal", or just as a "re-initialize request signal"), and also outputs a signal requiring the regeneration of clock signals (hereinafter referred to just as a "system clock generation signal") to the system clock generating circuit 5. When the control circuit 3 receives the re-initialize request signal, it starts re-transmission of the program data from the non-volatile memory 7 to the DRAM 2, and outputs to the interface 4 an access prohibition signal for prohibiting an access to the data stored in the DRAM 2. When the interface 4 inputs this access prohibition signal, reading from the DRAM 2 is prohibited until an access prohibition release signal for releasing the prohibition of access to the data in the DRAM 2 is output. When the re-transmission of the program data is completed, the control circuit 3 outputs the access prohibition release signal regarding the data stored in the DRAM 2 to the interface 4. When the interface 4 inputs this access prohibition release signal, an access of the CPU 1 to the program data stored in the DRAM 2 is enabled, and the CPU 1 thus starts its normal processing again.

As explained heretofore, according to the first embodiment of the present invention, the microcomputer is configured by the CPU 1, the DRAM 2 installed within the microcomputer, the non-volatile memory 7 in which a program data is stored, the interface 4 commonly used among various circuits within the microcomputer, the system clock generating circuit 5 which generates clock signals and is also capable of suspending and regenerating the clock signals, respectively in response to a system clock stop signal and a system clock generation signal, the peripheral circuit 6 which is capable of outputting an interrupt signal requiring the recovery of the generation of clock signals to the CPU 1, and the control circuit 3 which re-transmits the program data from: the non-volatile memory 7 to the DRAM 2 in response to a re-initialize request signal output from the CPU 1 and also outputs an access prohibition signal for prohibiting the access to the data stored in the DRAM 2 and an access prohibition release signal for releasing the prohibition of access, and due to this configuration, not only it can suspend the operation of the system clock, but also perform the normal operation of the microcomputer by re-transmitting the program data stored in the non-volatile memory to the DRAM after the generation of clock signals is resumed, so that the microcomputer requires only one clock signal generating circuit, and thus the power consumption can be greatly saved.

Second Embodiment

A microcomputer according to a second embodiment of the present invention has the same circuit configuration as that of the first embodiment shown in FIG. 1. This second embodiment is different from the first embodiment in that the peripheral circuit 6 detects the runaway of the CPU 1 and outputs an interrupt signal representing the request for recovery from the runaway, to the CPU 1.

The operation of the microcomputer of the above configuration is now explained as below.

The operation of the microcomputer when powered on is the same as that of the first embodiment, so that the detailed explanation thereabout is omitted here. As the DRAM is a memory into which data can be rewritten, an erroneous writing into the program data area within the DRAM 2 can occur due to the runaway of the CPU 1. On this occasion, as a data destruction in the DRAM 2 can occur, when the peripheral circuit 6 detects the runaway of the CPU 1, it outputs to the CPU 1 an interrupt signal representing the request for recovery of the data in the DRAM 2. When the CPU 1 receives this interrupt signal, it outputs a program data re-initialize request signal to the interface 4 and the control circuit 3. When the control circuit 3 receives this re-initialize request signal, it starts re-transmission of the program data from the non-volatile memory 7 to the DRAM 2, and outputs to the interface 4 an access prohibition signal for prohibiting an access to the data stored in the DRAM 2. When the interface 4 inputs this access prohibition signal, reading data from the DRAM 2 is prohibited until an access prohibition release signal for releasing the prohibition of access to the data stored in the DRAM 2 is output. When the re-transmission of the program data is completed, the control circuit 3 outputs the access prohibition release signal regarding the data stored in the DRAM 2 to the interface 4. When the interface 4 inputs this access prohibition release signal, an access of the CPU 1 to the program data stored in the DRAM 2 is enabled, and the CPU 1 thus starts processing to cope with the runaway phenomenon.

As explained heretofore, according to the second embodiment of the present invention, the microcomputer is configured by the CPU 1, the DRAM 2 installed within the microcomputer, the non-volatile memory 7 in which a program data is stored, the interface 4 commonly used among various circuits within the microcomputer, the system clock generating circuit 5 for generating clock signals, the peripheral circuit 6 which can detect the runaway of the CPU 1 and output an interrupt signal requesting the recovery from the runaway to the CPU 1, and the control circuit 3 which re-transmits the program data from the non-volatile memory 7 to the DRAM 2 in response to a re-initialize request signal output from the CPU 1, and also outputs an access prohibition signal for prohibiting an access to the data stored in the DRAM 2 and an access prohibition release signal for releasing the prohibition of access, and due to this configuration, when the runaway of the CPU 1 is detected, the runaway is informed to the CPU 1, and also an interrupt signal requesting recovery from the runaway is output to the CPU 1, wherein by retransmitting the program data stored in the non-volatile memory to the DRAM, an appropriate processing to cope with the runaway of the CPU can be securely performed, whereby even if the CPU is put in a runaway state, the microcomputer can operate properly when the runaway is recovered.

Third Embodiment

Figure 2:
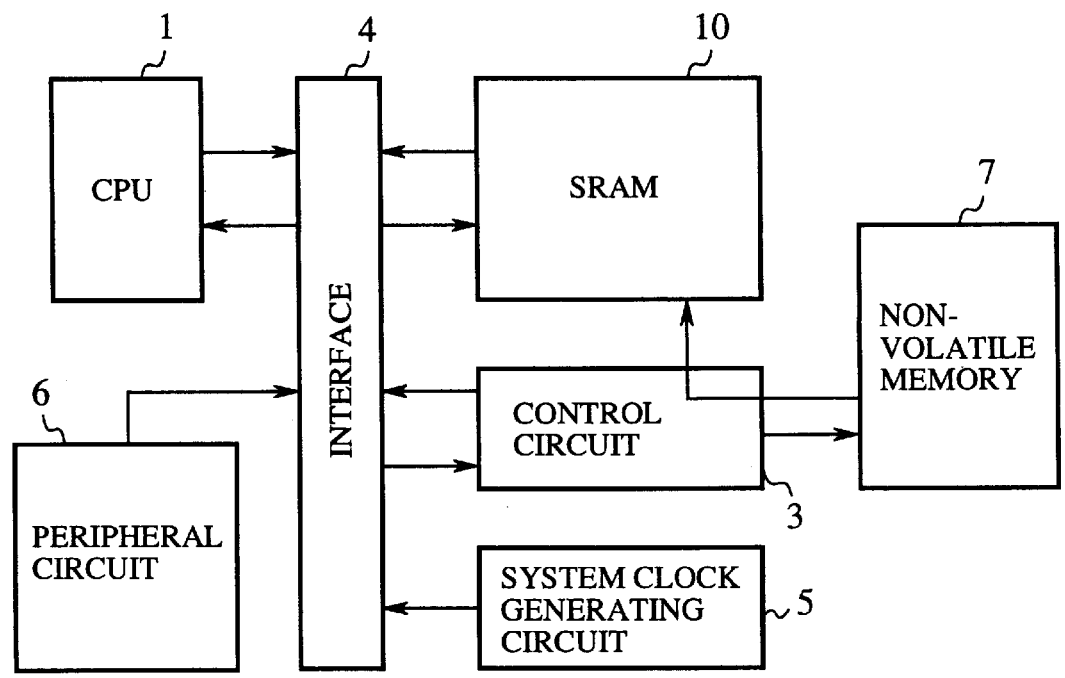
FIG. 2 is a schematic diagram showing the configuration of a microcomputer according to a third embodiment of the present invention.

FIG. 2 is a schematic diagram showing the microcomputer according to the third embodiment of the present invention. Since the same reference numerals as those in FIG. 1 indicate same or similar portions, the detailed explanation thereabout is omitted here. In the figure, reference numeral 10 denotes an SRAM which is installed in the microcomputer and stores therein a program data. This third embodiment is different from the second embodiment in that it is provided with the SRAM 10 instead of the DRAM 2.

The operation of the microcomputer of the above configuration is now explained as below.

The operation of the microcomputer when powered on is the same as that of the first embodiment, so that the detailed explanation thereabout is omitted here. As the SRAM is a memory into which data can be rewritten, an erroneous writing into the program data area within the SRAM 10 can occur due to the runaway of the CPU 1. On this occasion, as a data destruction in the SRAM 10 can occur, when the peripheral circuit 6 detects the runaway of the CPU 1, it outputs to the CPU 1 an interrupt signal representing the request for recovery of the data in the SRAM 10. When the CPU 1 receives this interrupt signal, it outputs a program data re-initialize request signal to the interface 4 and the control circuit 3. When the control circuit 3 receives this re-initialize request signal, it starts re-transmission of the program data from the non-volatile memory 7 to the SRAM 10, and outputs to the interface 4 an access prohibition signal for prohibiting an access to the data stored in the SRAM 10. When the interface 4 inputs this access prohibition signal, reading data from the SRAM 10 is prohibited until an access prohibition release signal for releasing the prohibition of access to the data in the SRAM 10 is output. When the re-transmission of the program data is completed, the control circuit 3 outputs the access prohibition release signal regarding the data stored in the SRAM 10 to the interface 4. When the interface 4 inputs this access prohibition release signal, an access of the CPU 1 to the program data stored in the SRAM 10 in the CPU 1 is enabled, and the CPU 1 thus starts processing to cope with the runaway phenomenon.

As explained heretofore, according to, the third embodiment of the present invention, the microcomputer is configured by the CPU 1, the SRAM 10 stored within the microcomputer, the non-volatile memory 7 in which a program data or the like is stored, the interface 4 commonly used among various circuits within the microcomputer, the system clock generating circuit 5 for generating clock signals, the peripheral circuit 6 which can detect the runaway of the CPU 1 and output an interrupt signal requesting the recovery from the runaway to the CPU 1, and the control circuit 3 which re-transmits the program data from the non-volatile memory 7 to the: SRAM 10 in response to a re-initialize request signal output from the CPU 1, and also outputs an access prohibition signal for prohibiting an access to the data stored in the SRAM 10 and an access prohibition release signal for releasing the prohibition of access, and due to this configuration, when the runaway of the CPU 1 is detected, the runaway is informed to the CPU 1 and also an interrupt signal requesting recovery from the runaway is output to the CPU 1, wherein by retranslating the program data stored in the non-volatile memory to the SRAM, an appropriate processing to cope with the runaway of the CPU can be securely performed, whereby even if the CPU is put in a runaway state, the microcomputer can properly operate when the runaway is recovered.

As explained heretofore, according to the first embodiment of the present invention, the microcomputer is configured by the CPU 1, the DRAM 2 installed within the microcomputer, the non-volatile memory 7 in which a program data is stored, the interface 4 commonly used among various circuits within the microcomputer, the system clock generating circuit 5 which generates clock signals and is also capable of suspending and regenerating the clock signals, respectively in response to the system clock stop signal and the system clock generation signal, the peripheral circuit 6 which is capable of outputting an interrupt signal requiring the recovery of the generation of clock signals to the CPU 1 and the control circuit 3 which re-transmits the program data from, the non-volatile memory 7 to the DRAM 2 in response to a re-initialize request signal output from the CPU 1, and also outputs an access prohibition signal for prohibiting the access to the data stored in the DRAM 2 and an access prohibition release signal for releasing the prohibition of access, and due to this configuration, not only it ban suspend the operation of the system clock, but also perform the normal operation of the microcomputer by re-transmitting the program data stored in the non-volatile memory to the DRAM after the generation of clock signals is resumed, so that the microcomputer requires only one clock signal generating circuit, and thus the power consumption can be greatly saved.

According to the second embodiment of the present invention, the microcomputer is configured by the CPU 1, the DRAM 2 installed within the microcomputer, the non-volatile memory 7 in which a program data is stored, the interface 4 commonly used among various circuits within the microcomputer, the system clock generating circuit 5 for generating clock signals, the peripheral circuit 6 which can detect the runaway of the CPU 1 and output an interrupt signal requesting the recovery from the runaway to the CPU 1, and the control circuit 3 which re-transmits the program data from the non-volatile memory 7 to the DRAM 2 in response to a re-initialize request signal output from the CPU 1, and also outputs an access, prohibition signal for prohibiting an access to the data stored in the DRAM 2 and an access prohibition release signal for releasing the prohibition of access, and due to this configuration, when the runaway of the CPU 1 is detected, the runaway is informed to the CPU 1, and also an interrupt signal requesting recovery from the runaway is output to the CPU 1, wherein by re-transmitting the program data stored in the non-volatile memory to the DRAM, an appropriate processing to cope with the runaway of the CPU can be securely performed, whereby even if the CPU is put in a runaway state, the microcomputer can operate properly when the runaway is recovered.

According to the third embodiment of the present invention, the microcomputer is configured by the CPU 1, the SRAM 10 stored within the microcomputer, the non-volatile memory 7 in which a program data or the like is stored, the interface 4 commonly used among various circuits within the microcomputer, the system clock generating circuit 5 for generating clock signals, the peripheral circuit 6 which can detect the runaway of the CPU 1 and output an interrupt signal requesting the recovery from the runaway to the CPU 1, and the control circuit 3 which re-transmits the program date from the non-volatile memory 7 to the SRAM 10 in response to a re-initialize request signal output from the CPU 1, and also outputs an access prohibition signal for prohibiting an access to the data stored in the SRAM 10 and an access prohibition release signal for releasing the prohibition of access, and due to this configuration, when the runaway of the CPU 1 is detected, the runaway is informed to the CPU 1 and also an interrupt signal requesting recovery from the runaway is output to the CPU 1, wherein by retranslating the program data stored in the non-volatile memory to the SRAM, an appropriate processing to cope with the runaway of the CPU can be securely performed, whereby even if the CPU is put in a runaway state, the microcomputer can properly operate when the runaway is recovered.

What is claimed is:

1. A microcomputer comprising:
   a CPU,
   a DRAM installed within the microcomputer,
   a non-volatile memory storing a program data therein, said non-volatile memory being installed in the microcomputer or provided outside the microcomputer,
   an interface commonly used among various circuits within the microcomputer,
   a system clock generating circuit, which generates clock signals, and is also capable of suspending and regenerating the clock signals, respectively in response to a system clock stop signal and a system clock generation signal,
   a peripheral circuit which is capable of outputting an interrupt signal requesting the system clock generation to the CPU, and
   a control circuit which re-transmits the program data from the non-volatile memory to the DRAM in response to a re-initialize request signal output from the CPU, and also outputs an access prohibition signal for prohibiting the access to the data stored in the DRAM and an access prohibition release signal for releasing the prohibition of access.

2. A microcomputer comprising:
   a CPU,
   a DRAM installed within the microcomputer,
   a non-volatile memory storing a program data therein, said non-volatile memory being installed in the microcomputer or provided outside the microcomputer,
   an interface commonly used among various circuits within the microcomputer,
   a system clock generating circuit, which generates clock signals, and is also capable of suspending and regenerating the clock signals, respectively in response to a system clock stop signal and a system clock generation signal,
   a peripheral circuit which is capable of outputting an interrupt signal requesting the system clock generation to the CPU, and
   a control circuit which re-transmits the program data from the non-volatile memory to the DRAM in response to a re-initialize request signal output from the CPU, and also outputs an access prohibition signal for prohibiting the access to the data stored in the DRAM and an access prohibition release signal for releasing the prohibition of access,
   wherein said system clock stop signal is a signal for suspending the generation of clock signals, and said system clock generation signal is a signal requiring the regeneration of clock signals, wherein both the system clock stop signal and the system clock generation signal are output from the CPU.

3. A microcomputer according to claim 2, wherein said clock generation signal is output in response to said interrupt signal.

4. A microcomputer comprising:
   a CPU,
   a DRAM installed within the microcomputer,
   a non-volatile memory storing a program data therein, said on-volatile memory being installed in the microcomputer or provided outside the microcomputer,
   an interface commonly used among various circuits within the microcomputer,
   a system clock generating circuit for generating clock signals,
   a peripheral circuit which is capable of detecting the runaway of the CPU, and also outputting an interrupt signal requesting the recovery from the runaway to the CPU, and
   a control circuit which re-transmits the program data from the non-volatile memory to the DRAM in response to a re-initialize request signal output from the CPU, and also outputs an access prohibition signal for prohibiting an access to the data stored in the DRAM and an access prohibition release signal for releasing the prohibition of access.

5. A microcomputer comprising:

a CPU, an SRAM installed within the microcomputer, a non-volatile memory storing a program data therein, said non-volatile memory being installed in the microcomputer or provided outside the microcomputer, an interface commonly used among various circuits within the microcomputer, a system clock generating circuit for generating clock signals, a peripheral circuit which is capable of detecting the runaway of the CPU, and also outputting an interrupt signal requesting the recovery from the runaway to the CPU, and a control circuit which re-transmits the program data from the non-volatile memory to the SRAM in response to a re-initialize request signal output from the CPU, and also outputs an access prohibition signal for prohibiting an access to the data stored in the DRAM and an access prohibition release signal for releasing the prohibition of access.

* * * * *